(12) United States Patent
Dodd

(10) Patent No.: US 6,321,211 B1
(45) Date of Patent: Nov. 20, 2001

(54) METHODS AND SYSTEMS FOR ELECTRONICALLY ACCEPTING AND EXCHANGING AN ONLINE GIFT

(75) Inventor: William K. Dodd, Marietta, GA (US)

(73) Assignee: RichFX, Inc., New York, NY (US)

( * ) Notice: Subject to any disclaimer, the term of this patent is extended or adjusted under 35 U.S.C. 154(b) by 0 days.

(21) Appl. No.: 09/348,198

(22) Filed: Jul. 6, 1999

(51) Int. Cl.[7] ............................................. G06F 17/60
(52) U.S. Cl. ................................................. 705/26
(58) Field of Search ................................. 705/14, 16, 26, 705/27, 35, 36, 55, 60, 37; 709/232, 246; 235/381, 371, 375, 379, 408; 700/231

(56) References Cited

U.S. PATENT DOCUMENTS

| | | |
|---|---|---|
| 5,362,948 | 11/1994 | Morimoto . |
| 5,500,514 * | 3/1996 | Veeneman et al. .................. 235/381 |
| 5,645,902 * | 7/1997 | Cheng ....................................... 428/5 |
| 5,652,421 * | 7/1997 | Veeneman et al. .................. 235/381 |
| 5,727,048 | 3/1998 | Hiroshima et al. . |
| 5,754,981 | 5/1998 | Veeneman et al. . |
| 5,761,648 | 6/1998 | Golden et al. . |
| 5,774,874 | 6/1998 | Veeneman et al. . |
| 5,809,144 | 9/1998 | Sirbu et al. . |
| 5,870,718 | 2/1999 | Spector . |
| 5,875,110 | 2/1999 | Jacobs . |
| 5,937,391 * | 8/1999 | Ikeda et al. ............................ 705/14 |
| 5,960,411 * | 9/1999 | Hartman et al. ....................... 705/26 |
| 6,092,114 * | 7/2000 | Shaffer et al. ........................ 709/232 |

FOREIGN PATENT DOCUMENTS

2000177280A * 6/2000 (JP) .

OTHER PUBLICATIONS

The Wall Street Journal, Christmas Gift You Don't Want,D. Sessa, p. 1, Jan. 1998.*
GiftCertificates.com, Gift Certificates: Digital Super Certificate, pp. 1–8.
ZDNet E–Business Best Practices Evaluation: Eddie Bauer gets wish list right, pp. 1–3.
NetGift Registry: About NetGift Registry, pp. 1–6.

* cited by examiner

Primary Examiner—James P. Trammell
Assistant Examiner—Pierre E. Elisca
(74) Attorney, Agent, or Firm—Finnegan, Henderson, Farabow, Garrett and Dunner L.L.P.

(57) ABSTRACT

Methods, systems, and articles of manufacture consistent with the present invention provide the ability for an online gift recipient to accept or exchange an online gift prior to shipping the gift to the recipient. A gift giver accesses a gift server over a network (such as the Internet) using conventional browser software on a user node of the network. While online with the gift server node (e.g. the gift server's website), the gift giver selects an online gift for the recipient from a variety of gifts supplied from one or more gift vendors. Information on the gift selection is sent to an gift queue on the gift server node while the recipient is notified of the gift, typically via an electronic mail message. In response to the notification, the recipient connects online to the gift server node, reads the gift selection information from the gift queue and determines whether to accept or exchange the gift. If the gift is to be exchanged, an electronic gift certificate is generated and another gift may be selected or different kinds of actual gift certificates may be selected as a replacement gift before an order for the initial gift is placed or the initial gift is shipped to the recipient.

40 Claims, 12 Drawing Sheets

FIG. 1A

FIG. 2C

Welcome to BLUE ROCK AVENUE The ultimate online shopping experience

| Gift Selection | Gift Reminder | Gift Schedule | Gift Registry | Express Gift | | AMERICAN EXPRESS |

Welcome to
EXPRESS GIFT

Happy Birthday, Mom! For your birthday, I am giving you this very special gift. To receive your gift, it's as easy as 1-2-3.

First, click on the photo icon to hear me sing a very special birthday message for you.

Second, click on the card to read your birthday greeting.

Finally, click on your gift to see what you're about to receive.

Express Gift is sponsored by American Express.

140 — CLICK ON PHOTO FOR A SPECIAL MESSAGE

141 — CLICK ON CARD FOR A SPECIAL GREETING

142 — CLICK ABOVE TO VIEW YOUR GIFT

143 —
A BIRTHDAY QUIZ FOR MOTHER
KNOW WHY YOUR NAME IS ON YOUR BIRTHDAY CAKE?
CLICK CARD TO OPEN

FIG. 2F

METHODS AND SYSTEMS FOR ELECTRONICALLY ACCEPTING AND EXCHANGING AN ONLINE GIFT

TECHNICAL FIELD

This invention relates to systems for online gift exchanging and, more particularly, to systems for electronically accepting and exchanging an online gift prior to shipping the gift.

BACKGROUND OF THE INVENTION

Gift giving is typically a very personal experience. In the conventional gift marketplace, a gift giver travels from store to store and finally selects a gift from a variety of gift items to match the recipient's own personal desires and needs. Once the gift is selected by the gift giver and purchased from the store vendor, the gift giver presents the selected gift to the recipient. Upon discovering what the gift is, the recipient may be overjoyed with delight or may be less than satisfied with the gift selection. In many cases, the less than satisfied situation is because the gift giver did not completely understand or perceive the recipient's desires and needs. Thus, the recipient is forced to physically return the gift to the vendor in exchange for another gift or a gift certificate.

In the electronic or online gift marketplace, the gift giver is no longer required to physically travel from store to store. As a result, the gift giving process has become a bit easier in that electronic commerce, commonly called "e-commerce", takes place across large data communications networks, such as the global Internet, and can be accomplished from one location using a single network device, such as a computer. Accordingly, in the electronic or online gift marketplace, the gift giver can search for the recipient's gift by browsing information at particular network locations (e.g., websites) using a conventional piece of software called a browser running on the computer. Many websites offer the ability for the gift giver to electronically purchase a gift item online. Once the item is selected online, a list of items selected to be purchased is usually maintained in what is commonly known as an online shopping cart. In such a situation, the gift giver can shop for and select the gift in a more efficient way.

However, the gains in shopping efficiency when conducted online are still coupled with the same exchange problems when compared to conventional shopping and gift giving. In an online situation, the recipient still must receive the gift and physically return it when they are not satisfied with the gift. In other words, a gift exchange still requires the recipient to get the gift and physically return it, resulting in continued inefficiencies.

Accordingly, there is a need for a system that allows for efficient acceptance and exchange for an online gift that does not require the recipient to receive an undesired gift and physically exchange the gift.

SUMMARY OF THE INVENTION

Methods, systems and articles of manufacture consistent with the present invention overcome the shortcomings of existing systems by permitting efficient online acceptance and customized exchanging of an online gift. The recipient of the online gift accepts or exchanges the online gift before the online gift is shipped from the gift's vendor. Methods, systems, and articles of manufacture consistent with the present invention, as embodied and broadly described herein, include a method for electronically exchanging an online gift prior to an order for the fulfillment of the online gift. First, a notification (such as an electronic mail message) related to the online gift is generated and sent to the recipient. The notification identifies a recipient for the online gift. Next, order information related to the online gift is retrieved and displayed to the recipient. If the recipient wants to exchange the online gift for a replacement gift, the replacement gift is selected from a group of alternative gift items. These alternative gift items are typically supplied by multiple vendors. Once the replacement gift has been selected, an electronic order for the replacement gift is placed prior to physically receiving the online gift.

In accordance with another aspect of the present invention, methods, systems, and articles of manufacture, as embodied and broadly described herein, describe a computer system within a networked environment for electronically exchanging an online gift prior to ordering the online gift from a vendor of the online gift. The system has a memory storage device that maintains a description of possible gift items including the online gift and a replacement gift. The system also includes a processor, which is coupled to the memory storage device. The processor is operative to generate a notification related to the online gift. The notification identifies a recipient for the online gift. The processor is also operative to retrieve order information related to the online gift and display the order information to the recipient. The processor is further operative to determine whether the recipient wants to exchange the online gift for a replacement gift. If the recipient wants to exchange the online gift for the replacement gift, the processor is also operative to select the replacement gift from the alternative gift items and place an electronic order to a vendor node in the networked environment for the replacement gift prior to physically receiving the online gift.

In accordance with yet another aspect of the present invention, methods, systems, and articles of manufacture, as embodied and broadly described herein, describe a computer-readable medium, which contains instructions for electronically exchanging an online gift prior to ordering the online gift from a vendor of the online gift. When the instructions are executed, a notification (such as an electronic mail message) related to the online gift is generated and sent to the recipient. The notification identifies a recipient for the online gift. Next, order information related to the online gift is retrieved and displayed to the recipient. If the recipient wants to exchange the online gift for a replacement gift, the replacement gift is selected from a group of alternative gift items. These alternative gift items are typically supplied by multiple vendors. Once the replacement gift has been selected, an electronic order for the replacement gift is placed prior to physically receiving the online gift.

BRIEF DESCRIPTION OF THE DRAWINGS

The accompanying drawings, which are incorporated in and constitute a part of this specification, illustrate an implementation of the invention. The drawings and the description serve to explain the advantages and principles of the invention. In the drawings, FIG. 1, consisting of FIGS. 1A–1C, are computer screen shot illustrations showing online gift selection and online gift scheduling user interfaces consistent with an exemplary embodiment of the present invention.

DETAILED DESCRIPTION

Figure 1B:
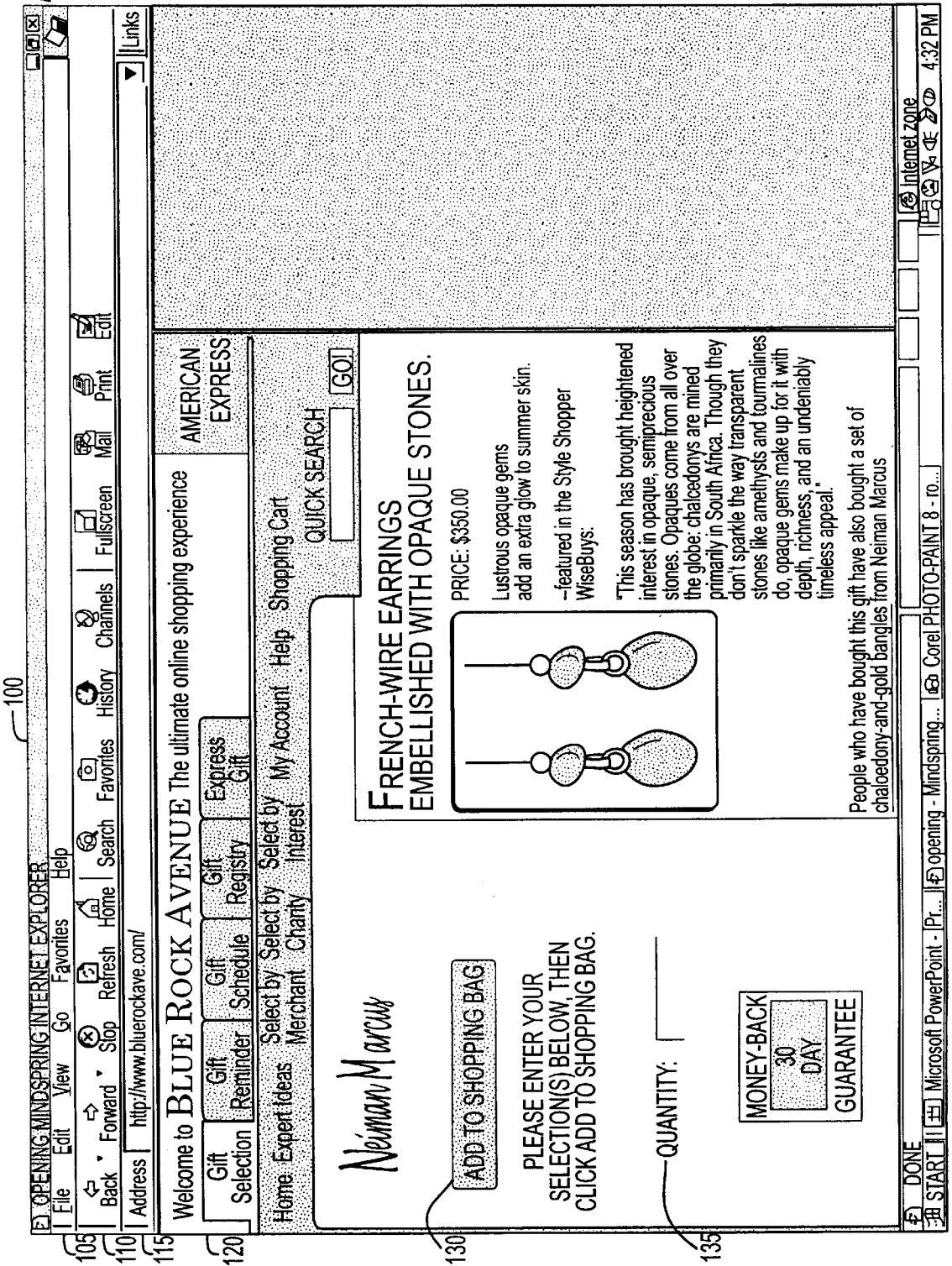

Reference will now be made in detail to an implementation consistent with the present invention as illustrated in the accompanying drawings. Wherever possible, the same reference numbers will be used throughout the drawings and the following description to refer to the same or like parts.

Introduction

In general, methods and systems consistent with the present invention allow the recipient of an online gift to accept it or exchange the gift for a substitute. This is advantageously done prior to shipping the gift so that the recipient need not wait until the gift arrives nor must the recipient physically take the gift to return or exchange it. Furthermore, the gift may be efficiently replaced online by one or more gift certificates from one or more vendors.

In more detail, a gift giver is a computer user who connects online to a gift server node in a computer network, such as the global Internet. In the embodiment described below, the gift giver accesses the gift server node as a website over the Internet using conventional browser software. While online with the gift server node (e.g. the gift server's website), the gift giver selects an online gift for the recipient from a variety of gifts supplied from one or more gift vendors. Once a gift selection is made, the gift selection (also called order information) is sent to a gift queue on the gift server node while the recipient is notified of the gift, typically via an electronic mail message. In response to the notification, the recipient then connects online to the gift server node, reads the gift selection from the gift queue and determines whether to accept or exchange the gift. If the gift is to be exchanged, an electronic gift certificate is generated and a replacement gift may be selected before a fulfillment order for the replacement gift is sent to a fulfillment queue and then transmitted to the vendor of the replacement gift. Alternatively, one or more gift certificates from one or more of the vendors associated with the gift server node may be advantageously selected to replace the initially selected gift User Interface An embodiment of the present invention uses the multimedia-rich World Wide Web (www) portion of the Internet to access the gift server node. FIGS. 1 and 2 tare a series of computer screen shot illustrations showing a user's perspective of an online gift selection, gift scheduling, gift acceptance and exchange that is consistent with an embodiment of the present invention. Referring now to FIG. 1, a window 100 is illustrated that is used when connecting with the gift server node. The window 100 is typically controlled by a conventional software application called a browser software application (not shown) and has conventional menu selections 105, iconic buttons 110 and an address field 115. Example browser software applications include Microsoft EXPLORER from Microsoft Corporation and Netscape NAVIGATOR from Netscape Corporation.

In order to connect to the gift server node, the user enters address information associated with the gift server node into the address field 115. In the exemplary embodiment, the user enters a conventional uniform resource location (URL), such as http://www.bluerockave.com into the address field 115 in order to establish an electronic or online connection to the gift server node at that network address. One skilled in the art will realize that such a URL is used to interrogate nameservers on the network to determine the appropriate IP address associated with the gift server node.

Once the online connection to the gift server node has been established, the user's computer and the gift server node communicate with each other so that gift information is displayed in a content area 120 of window 100. In the exemplary embodiment, content area 120 includes multimedia graphics and text related to topics such as recipient selection, gift ideas, gift selection and gift scheduling. For example, content area 120 of window 100 includes gift ideas for a person's birthday. The person intended to be the recipient of such a gift is identified in recipient field 128. In the exemplary embodiment, contact information associated with the recipient is also entered, such as the recipient's electronic mail address. In other embodiments, it is contemplated that the contact information may include a telephone number, facsimile information, a street or postal address, or any other kind of information on how to contact the recipient. In summary, the contact information is used by the gift server node to notify the recipient of their gift prior to placing the order for the gift with the vendor.

A variety of gift items from one or more gift vendors are displayed in the content area 120 for selection. In the example, one such gift item appears for selection as a graphical representation 125 of a set of earrings from Neiman Marcus (a vendor). If the user positions a pointing device, such as a mouse cursor, over the earring representation 125, more information about the earrings will be displayed as shown in FIG. 1B.

Referring now to FIG. 1B, additional information about the earrings is displayed in content area 120. If the user (i.e., the gift giver) thinks that the earrings will make an appropriate gift for the recipient, the user enters a quantity amount in field 135 and positions the pointing device over a button 130 to add the gift item to the user's "shopping bag." In this manner, the user can select one of the gift items from a variety of gift items from one or more vendors.

In the exemplary embodiment, the user can select how to fulfill and deliver the gift selection. In other words, the user can select either (1) an exchangeable fulfillment option, preferably called an EXPRESS GIFT™ service fulfillment option, that allows the recipient to easily and efficiently exchange the gift or (2) a direct order fulfillment option where the selected gift is sent directly to the recipient without allowing the recipient to exchange it prior to shipping the gift. This gift process can be done for current gift giving events, such as a recent birthday or anniversary, as well as scheduled for future events. FIG. 1C illustrates an exemplary display of scheduled gift events, such as gift selections for multiple recipients related to future birthdays and holidays.

As previously mentioned, when the exchangeable fulfillment option is selected, the user is able to create an online exchangeable gift for the recipient. Additionally, the gift selection and notification can be customized with features, such as a including a special or personalized multimedia message and multimedia greeting along with information about the selected gift. Typically, the recipient receives notification through electronic mail that a gift selection has been made for them. The notification may include instructions to connect to the gift server node, such as "Click on this Link to find out more about your gift."

In one embodiment, the recipient may be automatically associated with the appropriate gift order information due to an identifier associated with the recipient. In such a situation, the gift server node automatically determines it is the recipient who has connected to it from the recipient's network ID or recipient's IP address that is part of any message being sent from the recipient to the gift server node. Thus, in this embodiment, the identifier is any information (such as the recipient's network ID or IP address) that is automatically determinable by the gift server node to identify the recipient and match it with the appropriate gift order information.

In another embodiment, the identifier may be a predetermined name, number, code, or any other type of identification information provided by the gift server node in the notification associated with the order information intended for the recipient. Thus, if the recipient later connects to the gift server node and the recipient manually provides the identifier back to the gift server node, the gift server uses the identifier to obtain the order information intended for the recipient. Typically, the identifier is simply the recipient's electronic mail address or a predetermined order confirmation number. For example, the recipient may receive the notification (which includes the identifier, e.g., an order number, to be used when claiming the online gift), later connect to the gift server node and enter the identifier within a text field so that the gift server can search for and find the appropriate order information associated with the recipient.

Figure 2A:
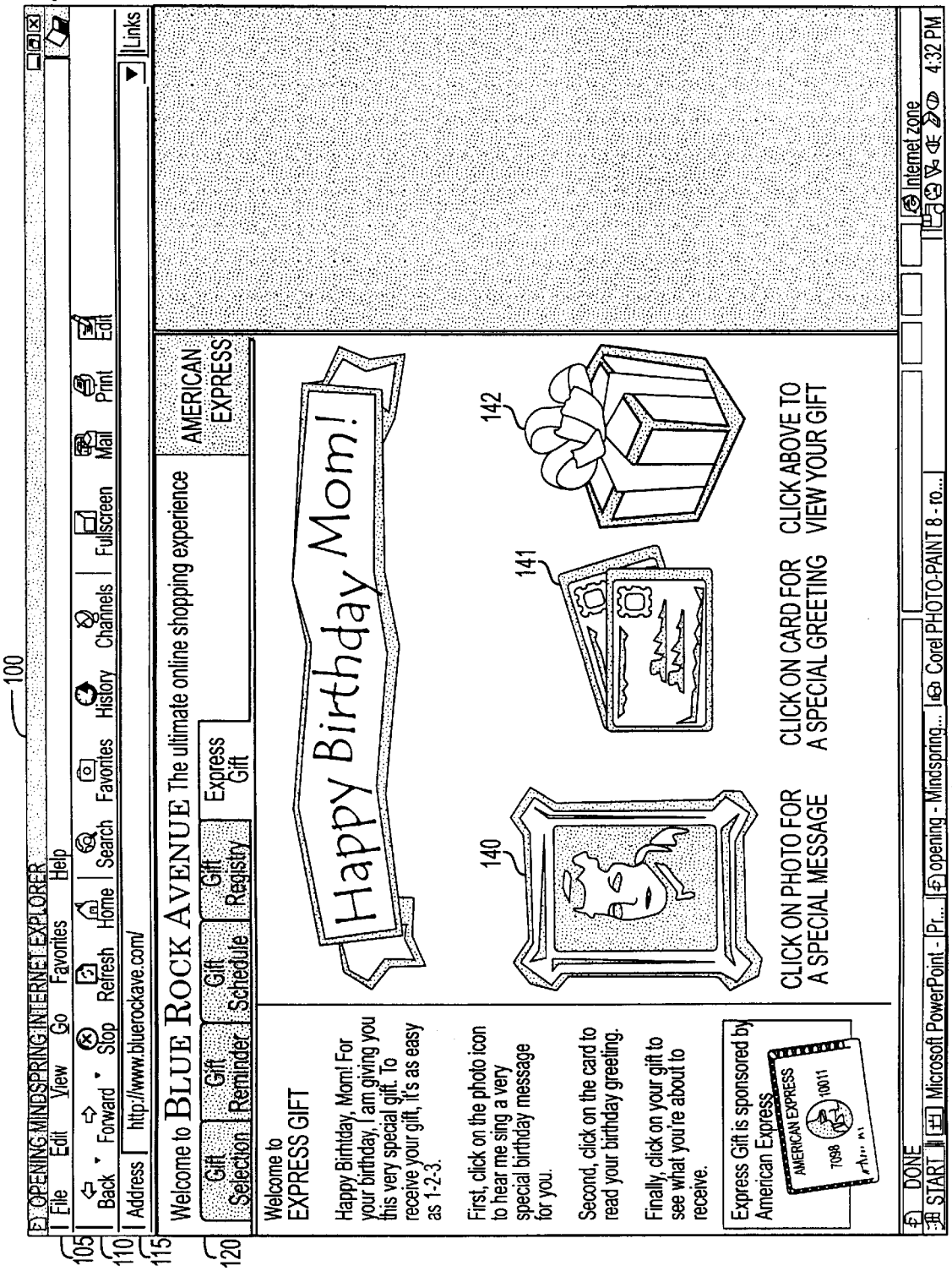
FIG. 2, consisting of FIGS. 2A–2F, are computer screen shot illustrations showing online gift delivery and exchange user interfaces consistent with an exemplary embodiment of the present invention.

At this point, the gift server node reads the appropriate order information from the gift queue and displays it to the user. For example, the recipient may be Mom who receives an electronic mail notification on behalf of her daughter, Kelly. FIG. 2A is a computer screen shot illustration of what the recipient (Mom) would see after connecting to the gift server node and the appropriate gift information is read from the gift queue and displayed on the screen of her computer.

Referring now to FIG. 2A, the EXPRESS GIFT™ service summary page is displayed illustrating a summary of information related to the gift selection for Mom. Aside from being able to view information about the selected gift using a present icon 142, the EXPRESS GIFT™ service summary page provides a special audio message from the gift giver (Kelly) using a photo icon 140 along with a special greeting using a card icon 141. As a result, when the recipient (Mom) positions the mouse cursor over photo icon 140, content area 120 is updated as shown in FIG. 2B.

Figure 2B:
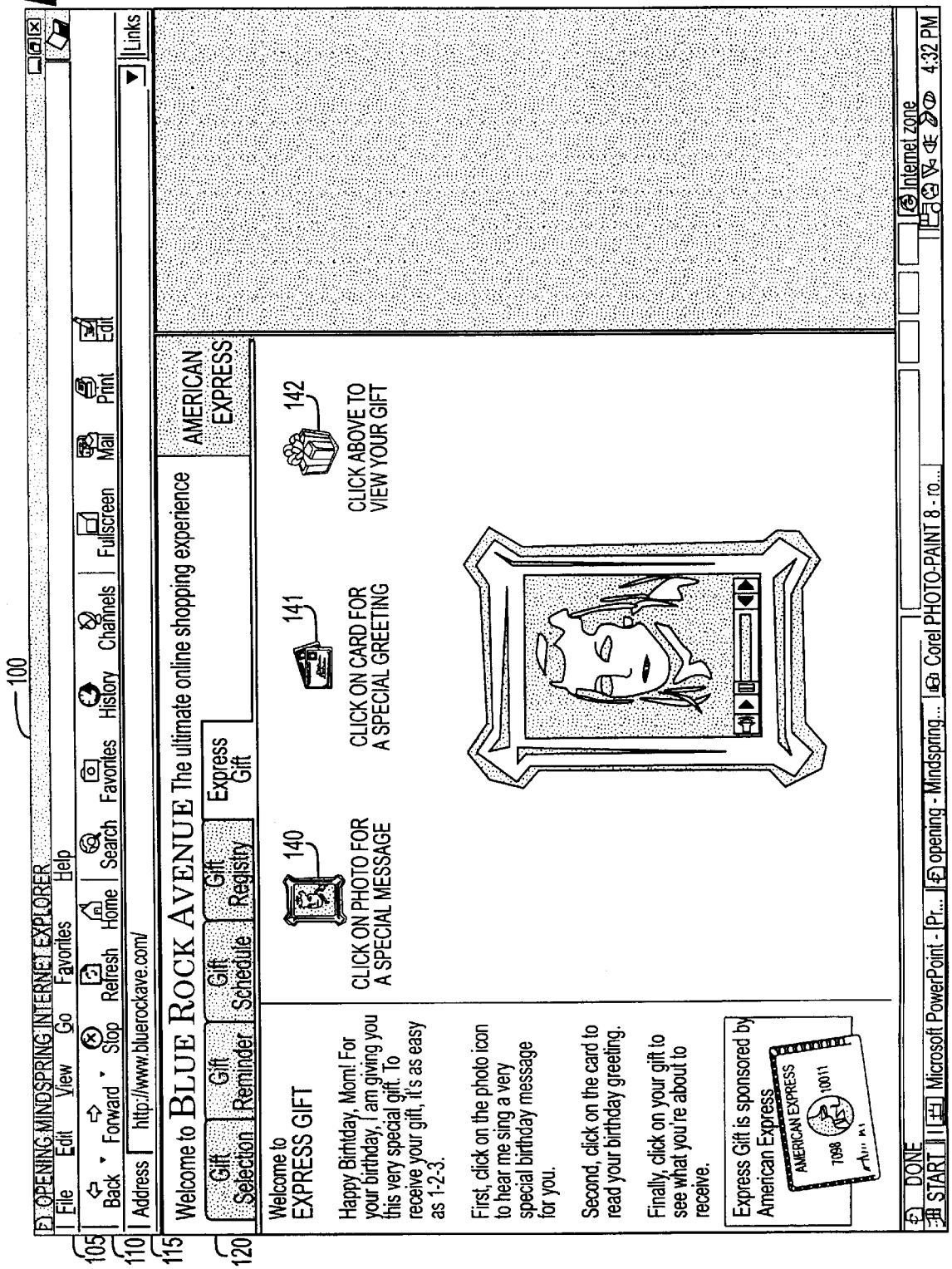

Referring now to FIG. 2B, the gift server node provides the recipient (Mom) with a special message, such as an audio and/or video clip singing a traditional "Happy Birthday" tune for the recipient. When the recipient (Mom) positions the mouse cursor over card icon 141, content area 120 is updated as shown in FIG. 2C.

Referring now to FIG. 2C, a multimedia greeting card 143 is illustrated that has been customized for the recipient. Upon clicking on greeting card 143, the greeting card 143 opens and content area 120 is updated as shown in FIG. 2D.

Figure 2D:
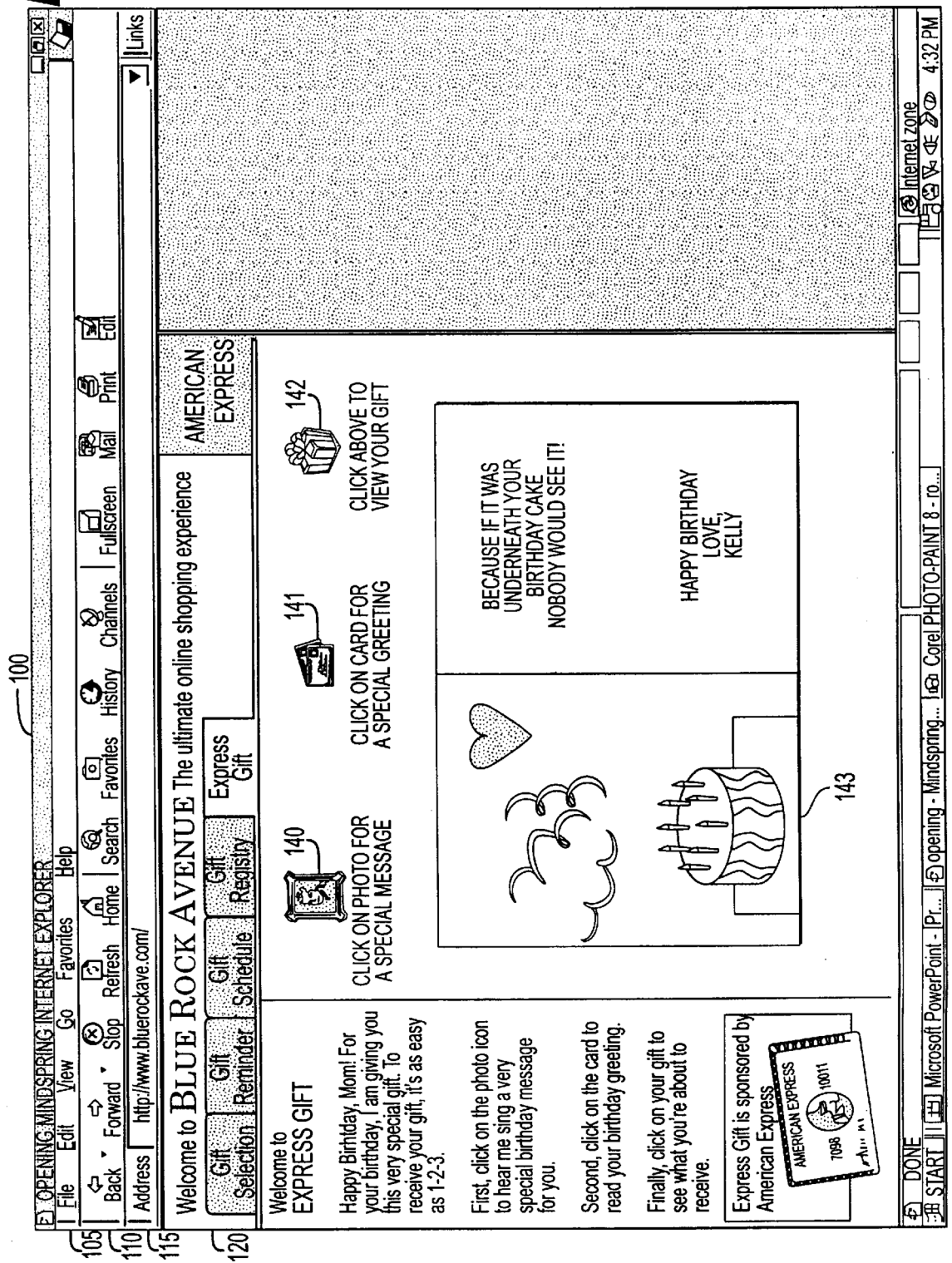

Referring now to FIG. 2D, the inside of greeting card 143 is now displayed to the recipient (Mom). In this example, the greeting card 143 opens up to reveal a personalized birthday message from the gift giver (Kelly) that was created during the gift selection process. Next, when the recipient (Mom) positions the mouse cursor over present icon 142, content area 120 is again updated as shown in FIG. 2E.

Figure 2E:
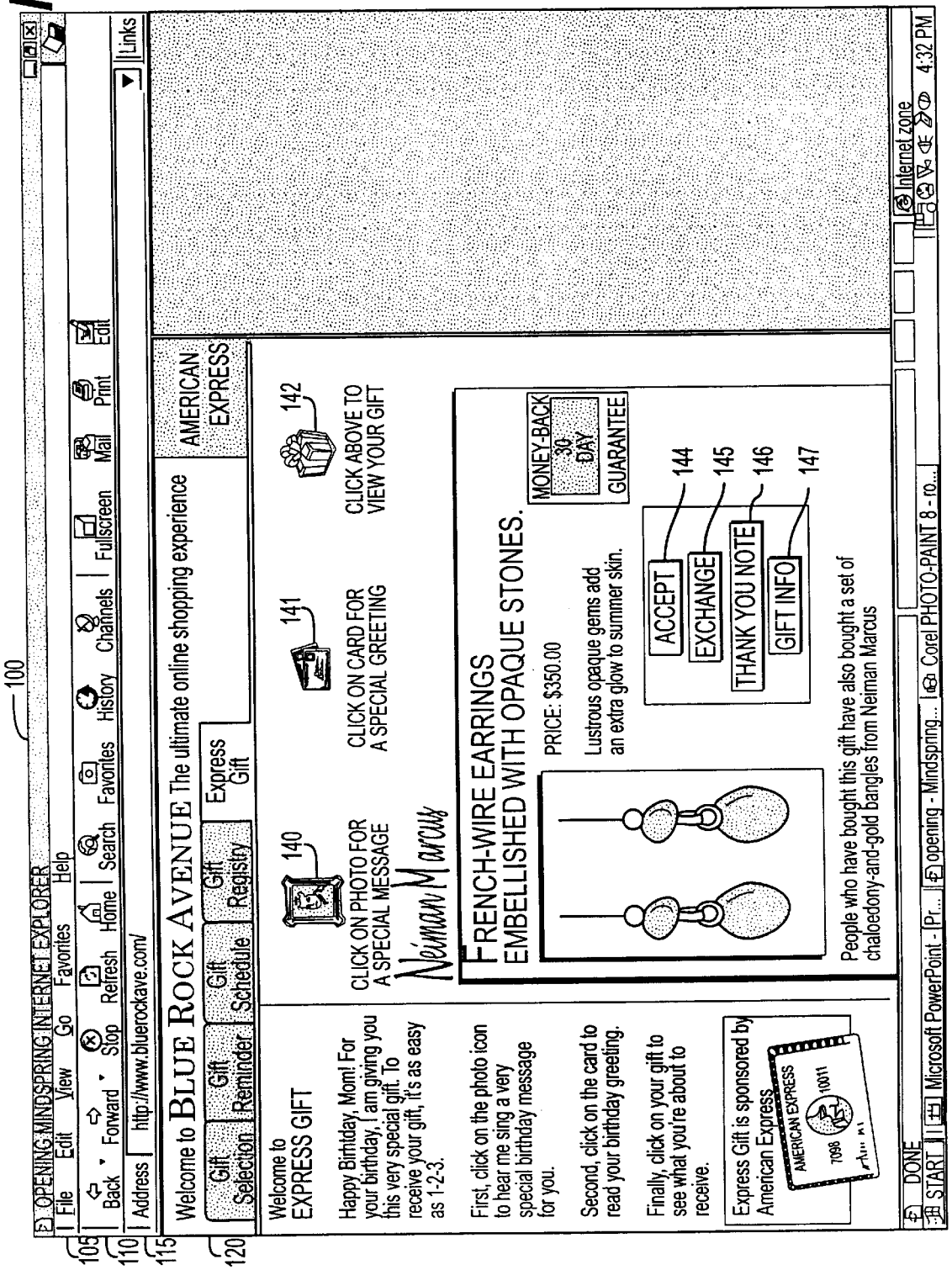
Figure 2F:
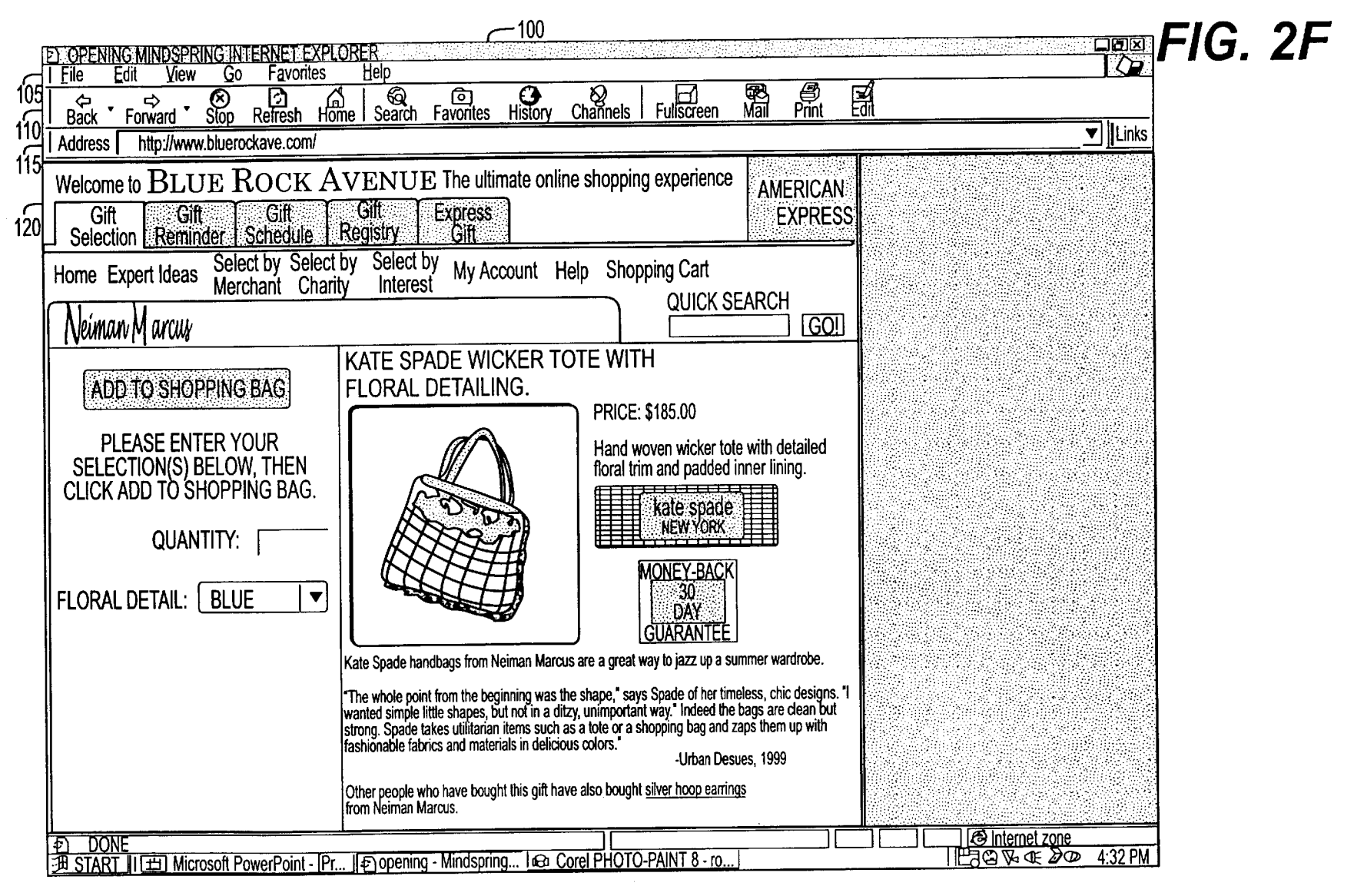

Referring now to FIG. 2E, the selected gift is graphically shown to the recipient along with product details associated with the selected gift. In the example, the selected earrings from Neiman Marcus are shown in content area 120 as being the selected gift for the recipient (Mom). If the recipient wants to keep the selected gift, the recipient selects an "ACCEPT" button 144 within content area 120 and an order for the selected gift is transmitted electronically to the vendor for shipment to the recipient. However, if the recipient determines they are not satisfied with the selected gift, the recipient selects an "EXCHANGE" button 145 and content area 120 is changed to allow the recipient to either select a replacement gift as shown in FIG. 2F or a gift certificate for one or more of the vendors associated with the gift server node. This advantageously allows for the gift to be very efficiently exchanged online and with a great degree of flexibility prior to placing a fulfillment order with the actual vendor or shipping the product from the vendor. This reduces the previously required time, effort and cost involved with physically receiving, physically returning the gift, and selecting a replacement gift.

Additionally, the recipient has the ability to automatically send the gift giver a thank you note reply by selecting the "THANK YOU NOTE" button 146. In the exemplary embodiment, the thank you note is preferably an electronic mail message from the recipient to the gift giver. However, it is contemplated that such a thank you note could be any other type communication, such as an automated telephone call, a facsimile message, a post card, a computer generated letter or a telegram.

Furthermore, the recipient has the ability to get more information about the selected gift by selecting a "GIFT INFO" button 147 from within the contact area 120. The existing information being shown, such as the information shown about the earrings in FIG. 2E, may not be enough for a recipient to decide whether to accept or exchange the selected gift. In the exemplary embodiment, the additional information may be stored for retrieval in a database of product information. Once more information is presented to the recipient on the selected gift, then the recipient may be able to make an informed decision on whether to accept the selected gift.

Network Operating Environment

Figure 3:
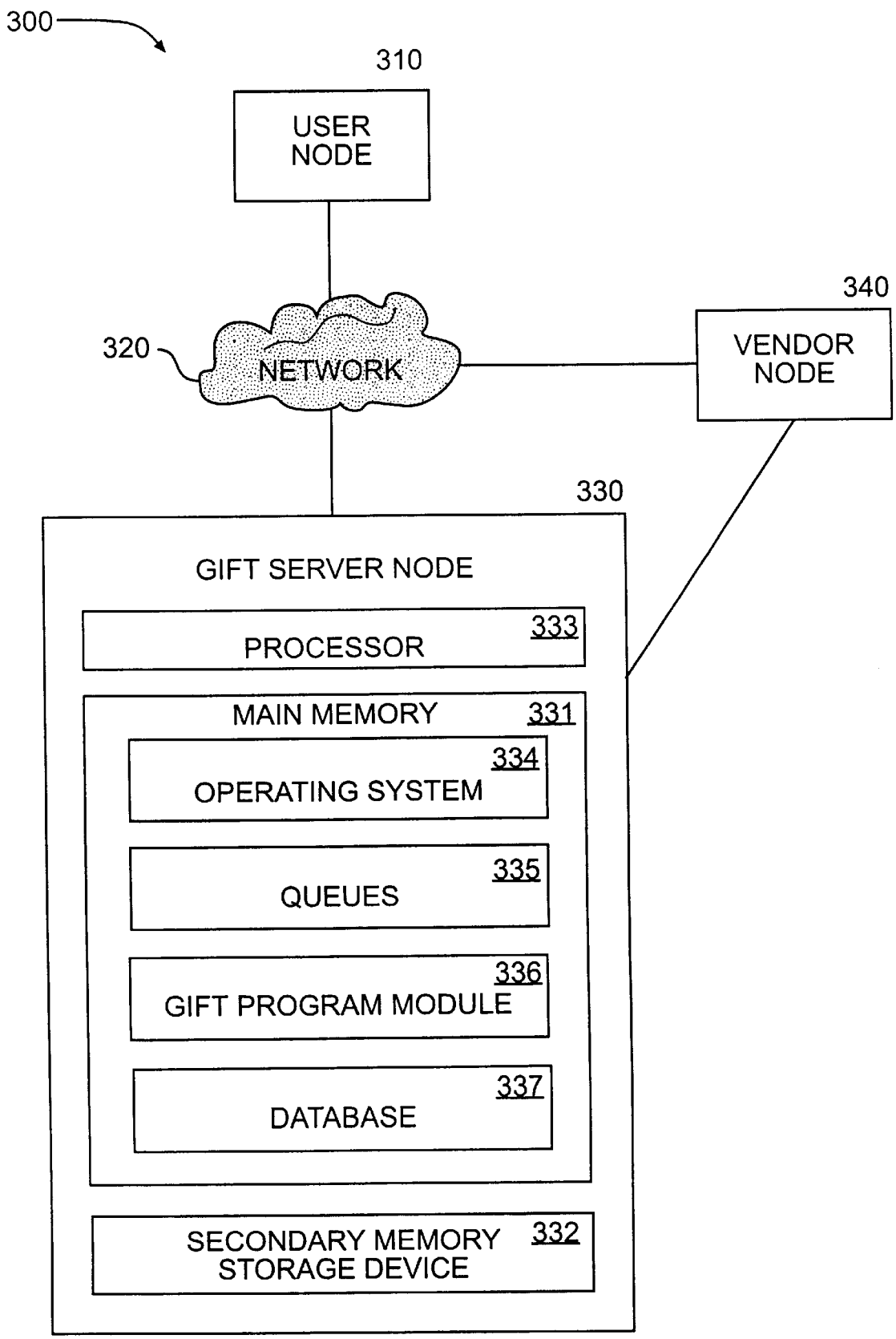
FIG. 3 is a block diagram of an exemplary networked system suitable for use with methods and systems consistent with an exemplary embodiment of the present invention.

In the context of the above discussion about how an embodiment of the present invention is used from a user's perspective, an embodiment of the present invention is further described below as being implemented within a data communications network of interconnected nodes. FIG. 3 depicts an exemplary networked system 300 suitable for practicing methods and implementing systems consistent with the present invention.

Referring now to FIG. 3, network system 300 includes a user computer system 310 connected as a node on a network 320, such as a Local Area Network, Wide Area Network, or the Internet. The user computer system 310 (also called a user node or customer node) is connected via network 320 to a gift server computer system 330 (also called a gift server node).

Gift server computer system 330 is preferably configured as a website server for network 320. Gift server computer system 330 contains a memory storage device called main memory 331, a secondary memory storage device 332, and a processor 333, each of which are electronically coupled to the other parts of computer system 330. In an exemplary embodiment consistent with the present invention, gift server computer system 330 is typically implemented as a SPARC™ server computer manufactured by Sun Microsystems of Mountain View, Calif. Further details regarding the SPARC™ computer architecture of such a server can be found in a number of texts, including the SPARC™ V9 Reference Manuals available from SPARC International of Menlo Park, Calif., which are hereby incorporated by reference. However, one skilled in the are till realize that other computers or network devices may also be used to implement system 330.

In gift server computer system 330, main memory 331 contains an operating system 334, typically implemented using the SOLARIS operating system distributed by SunSoft and associated with Sun Microsystems. One skilled in the art will be familiar with multi-tasking and multi-threaded operating systems such as the SOLARIS operating system. Further details regarding the SOLARIS operating system can be obtained from SunSoft or through the numerous commercially available references on the subject.

Main memory 331 in gift server computer system 330 also contains other program modules and data structures for use when serving as a website server in accordance with an embodiment of the present invention. For example, main memory 331 contains several memory data structures (referred to as queues 335), a gift program module 336, and a database 337, each of which are used when interacting with user node 310. Essentially, the gift program module 336 is responsible for communicating with the user node 310 (preferably using conventional http protocol) and providing gift-related content (as illustrated in FIGS. 1A–1C and 2A–2F) to the user node 310. Additionally, the gift program module 336 is responsible for receiving gift selection information, recipient content information, payment information and other data from the user so that gift information is either stored in a queue to present to the recipient or transmitted directly to a vendor node 340. Information about each kind of gift item is normally stored in database 337 for use by gift program module 336 during gift selection or when the recipient desires more information regarding a particular gift item.

In summary, program module 336, queues 335, and database 337 are used to service website inquiries from user node 310 and prepare to fulfill and complete the gift transaction. This is normally accomplished either by directly transmitting an order to vendor node 340 or by storing the gift information in a gift queue. This allows the recipient to connect to the gift server computer system 330 and to accept or exchange the gift identified in the gift queue prior to transmitting the fulfillment order to vendor node 340.

Conceptually, there are many nodes connected to network 320 through which the gift giver and the recipient can gain access to gift server computer system 330. In order to avoid confusion, only one user node is shown in FIG. 3. However, one skilled in the art will quickly realize that the gift giver and the recipient may both use the same node to access the gift server computer system 330 or may use entirely different nodes (not shown).

Furthermore, if the recipient elects to send a thank you reply (such as when the recipient selects the "THANK YOU NOTE" button 146 in FIG. 2E), gift server computer system 330 can formulate an electronic message to be sent to the recipient via the network 320.

One skilled in the art will also realize that the gift program module 336 may be implemented in a variety of ways, such as using commercially available Website server software such as BroadVision software, using custom object-oriented code written in the C++ programming language or using applets written in the Java™ programming language, or may be implemented as a hardwired application specific integrated circuits (ASIC) custom designed just for this purpose. Additionally, one skilled in the art will realize that gift program module 336 may be implemented as a single code section or a variety of distinct code elements that functionally interrelate with each other to accomplish the described tasks.

Moreover, one skilled in the art will appreciate that all or part of systems and methods consistent with the present invention may be stored on or read from other computer-readable media, such as secondary storage devices, like hard disks, floppy disks, and CD-ROM; a carrier wave received from the Internet; or other forms of computer-readable memory, such as read-only memory (ROM) or random-access memory (RAM). Finally, although specific components of gift server computer system 330 have been described, one skilled in the art will appreciate that a data processing system suitable for use with the exemplary embodiment may contain additional or different components, such as multiple processors, routers or subnetworks and a variety of input/output devices.

Figure 4:
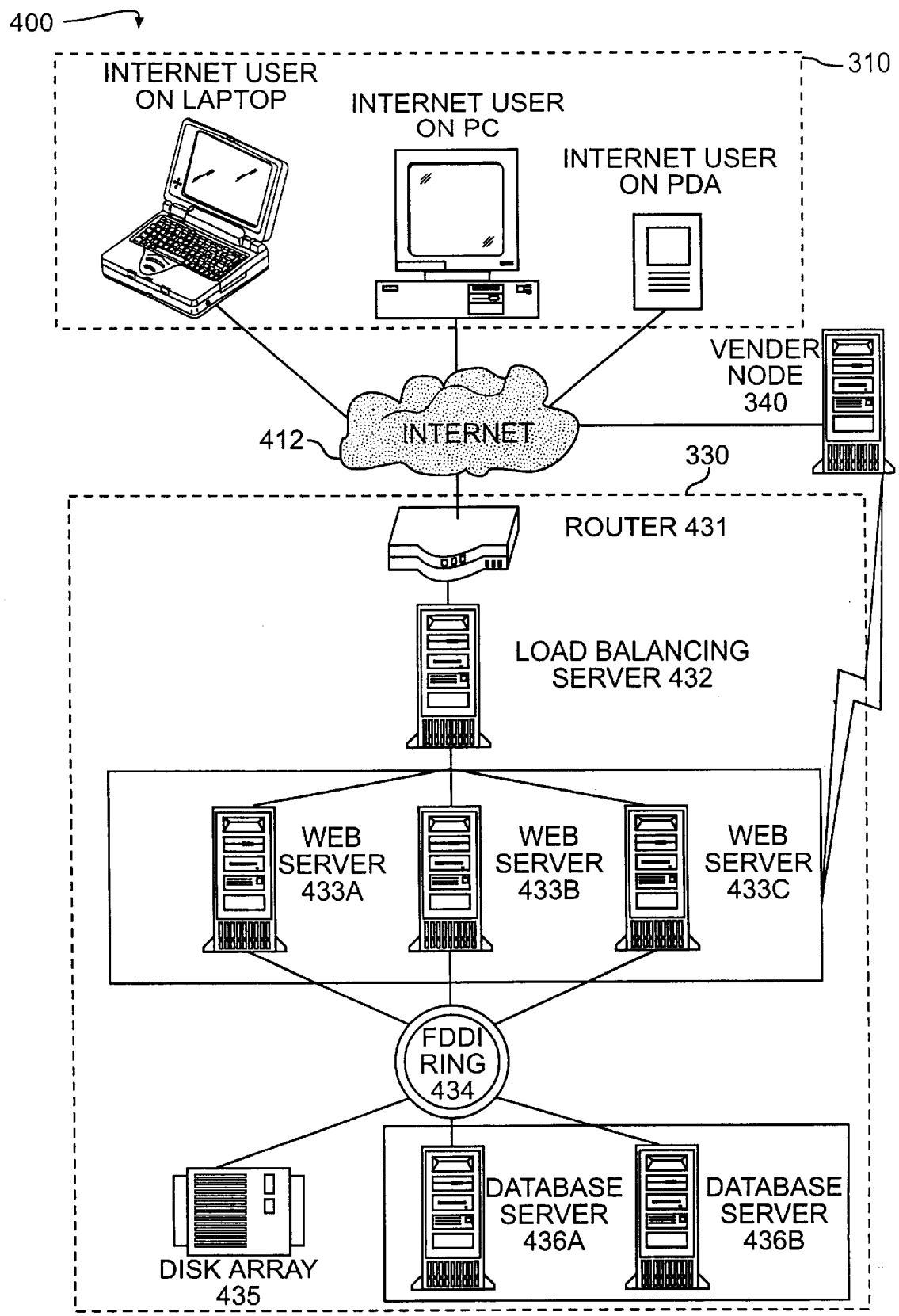
FIG. 4 is a more detailed block diagram of an exemplary networked system of nodes suitable for use with methods and systems consistent with an embodiment of the present invention.

FIG. 4 is a block diagram of a more detailed networked system of interconnected nodes suitable for use with methods and systems consistent with an embodiment of the present invention. Referring now to FIG. 4, the detailed network system 400 is similar to network system 300 but implements certain components differently. For example, user node 310 is illustrated in FIG. 4 as including a variety of different user nodes. These different user nodes include a laptop computer 402, a conventional desktop personal computer 404, and a personal digital assistant (PDA) 406. Each of these user nodes has access to the Internet 412. In this manner, each of the user nodes can be used by a gift giver to connected to the gift server computer system 330 through the Internet 412.

While user node 310 graphically encompasses all three types of users nodes (laptop, desktop, and PDA), it is to be understood that a gift giver and a recipient need only use one of these to access the Internet 412 in accordance with an embodiment of the present invention.

Using the same example in this more detailed hardware environment, the gift giver user (Kelly) may connect to the Internet 412 using the desktop personal computer 404 and conventional browsing software (not shown). Upon entering the URL address of the gift server computer system 330 into address field 115, a message is sent over the Internet 412 to gift server computer system 330 in order to establish a connection with system 330.

While gift server computer system 330 may be implemented as a single computer (as described in FIG. 3), gift server computer system 330 may also be implemented as a more complex system of interconnected computing and networking components that cooperatively operate to service inquiries from the Internet 412. As illustrated in FIG. 4 in this later type of configuration, gift server computer system 330 is preferably made up of a router 431, a load balancing server 432, and a predetermined number of redundant web servers 433a–433c. The message arrives from the user node (e.g., the desktop computer 404) and is typically sent to router 431 where it is forwarded to load balancing server 432. Load balancing server 432 determines which of the web servers 433a–433c is least loaded and then sends the message to that web server (e.g., web server 433a). In the exemplary embodiment, each of the web servers are preferably implemented using SPARC™ server computers from Sun Microsystems running BroadVision web hosting software. In this manner, a connection is established between the user node (e.g., the desktop computer 404) and the gift server computer system 330.

To provide the appropriate website content (similar to that illustrated in FIG. 1 and FIG. 2) to the user node, gift server computer system 330 also preferably includes an FDDI ring 434 having connections to each of the web servers 433a–433c. A disk array 435 and a predetermined number of redundant database servers 436a–436b are also connected to the FDDI ring 434. The disk array 435 functions as secondary memory storage and the database servers 436a–436b operate to maintain and provide information, such as descriptions and information on gift items, to the web servers 433a–433c as needed. In the exemplary embodiment, each of the database servers 436a–436b are preferably SPARC™ server computers from Sun Microsystems running conventional database software from Oracle.

While FIG. 4 illustrates using three web servers and two database servers, one skilled in the art will recognize that the actual number of such servers is empirically determined according to performance criteria. Thus, the appropriate number of each server will depend upon a variety of performance factors, such as how often user nodes send messages to gift server computer system 330 and how many different gift items and other content needs to be available for the website hosted by gift server computer system.

Thus, in the birthday gift example, the message is routed to web server 433a which responds by sending gift selection information back to the desktop personal computer 404. The display on the desktop personal computer 404 displays a window similar to window 100 in FIG. 1A and includes information on possible gift selections in content area 120. If information on additional gift items is needed, web server 433a typically searches its own local memory for such information or sends a database request to one of the database servers 436a for the additional information.

After a gift has been selected and the gift giver has provided contact information for the recipient (such as an electronic mail address for the recipient), web server 433a typically sends a notification message to the recipient. At that point, the recipient may use any of the user nodes (such as the laptop 402) to check their electronic mail messages and will find the notification in their electronic mail inbox. The recipient then connects to the gift server computer system 330 through the Internet 412 and either manually provides an identifier to the web server 433a or the web server 433a automatically determines the identifier that links or associates the recipient with the appropriate order information on the selected gift, such as the information displayed in content area 120 in FIG. 2A.

At this point, the user is able to accept the selected gift or exchange it for a replacement gift item from the same vendor, a replacement gift item from a different vendor or an electronic gift certificate from one or more vendors. If additional information is requested by the recipient, web server 433a can search its local memory or request such information from one of the database servers 436a–436b.

An electronic gift certificate is essentially an electronic representation for an actual gift certificate that will be mailed out, but can also be considered a method of payment. For example, if the selected gift is a conventional gift certificate from a particular vendor and the recipient desires to exchange this for an actual product, the gift server computer system 330 generates an electronic gift certificate and then allows the recipient to select the replacement gift from one of the many other vendors associated with the system 330. In this manner, the electronic gift certificate is similar to a form of currency or payment. If the replacement gift costs less than the original gift, another electronic gift certificate is generated for the difference amount. Furthermore, the recipient is able to designate if only one gift certificate should issue for one of the vendors or if multiple gift certificates in predetermined amounts should issue from a selected group of vendors. This provides yet another level of customized and efficient gift exchange and replacement.

In summary, the exchange process is advantageously accomplished through interactions with the user node (e.g., laptop 402) and gift server computer system 330 (e.g., web server 433a) prior to any fulfillment order being issued or transmitted from system 300 to vendor node 340 and prior to any product (actual product item or actual gift certificate) shipping from any vendor to the recipient. One skilled in the art will recognize that the transmission of such a fulfillment order may take place in a variety of manners, such as through a message sent directly between the gift server computer system 330 and the vendor node 340 via electronic data interchange (EDI) on a dedicated communications line or through a message sent out over the Internet 412.

Additionally, a thank you replay may be generated within web server 433a and transmitted from web server 433a to the gift giver (e.g., on the desktop personal computer 404) on behalf of the recipient.

Online Gift Exchanging Process

Further details on steps of an exemplary method in accordance with an embodiment of the present invention for accepting and exchanging a gift online prior to shipping the gift will now be explained with reference to the flow chart of FIG. 5.

Figure 5:
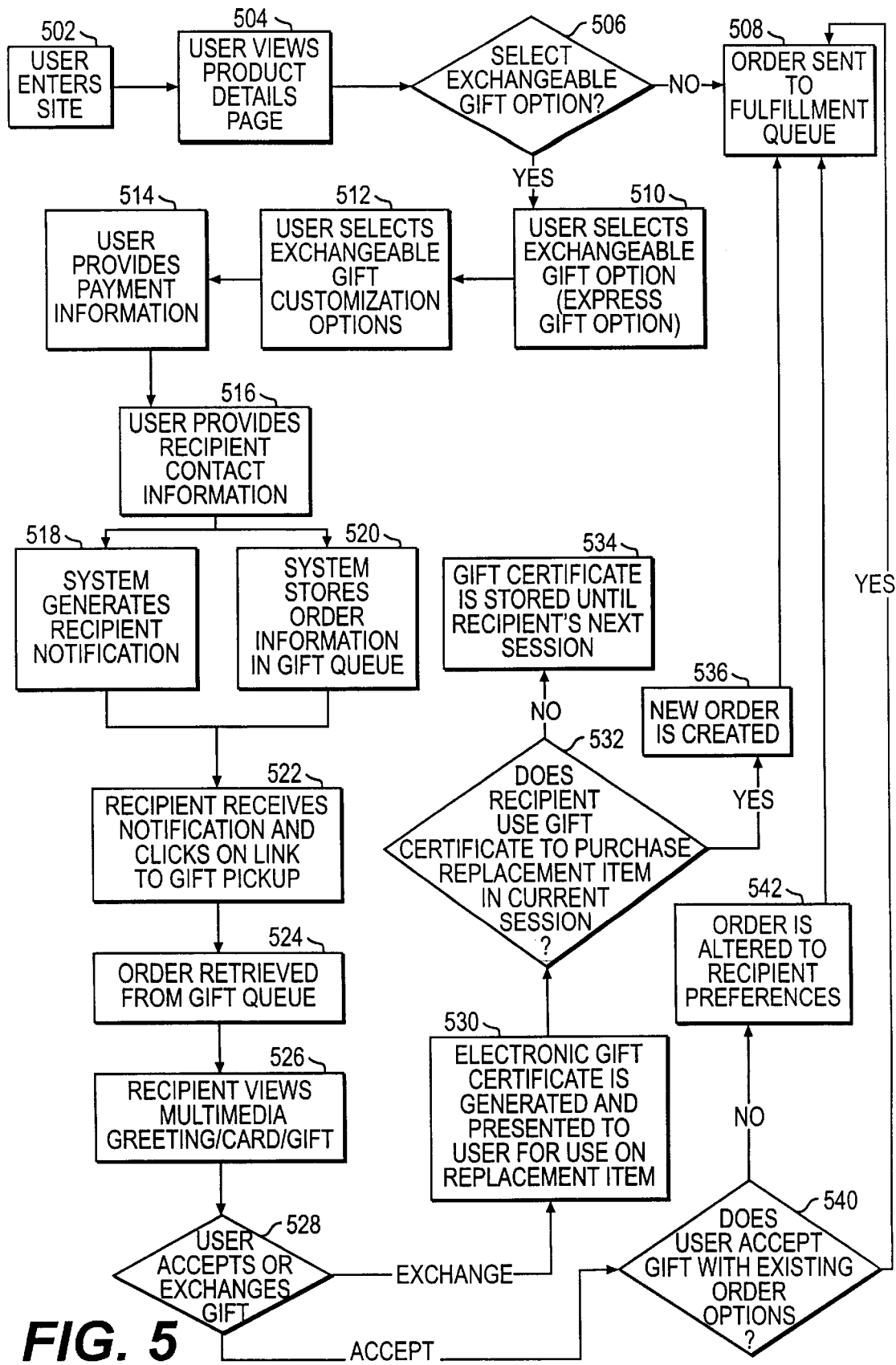
FIG. 5 is a flow chart illustrating typical steps for electronically exchanging an online gift prior to shipping the online gift consistent with an exemplary embodiment of the present invention.

Referring now to FIG. 5, the method 500 begins at step 502 where the user or gift giver enters the site. In the exemplary embodiment, the user or gift giver uses one of the user nodes and conventional browser software to access the gift server computer system 330 in order to enter the website. At step 504, the user views product details, such as the information presented in content area 120 as shown in FIG. 1A.

At this point, the user selects a gift from the various gifts available and now must determine how to send the gift (also called fulfillment options for the gift). At step 506, if the user selects an exchangeable fulfillment option (preferably called an EXPRESS GIFT™ service fulfillment option), step 506 proceeds to step 510. Otherwise, the user has selected a direct order fulfillment option and step 506 proceeds directly to step 508 where the order of gift information is sent to a fulfillment queue (i.e., one of the queues 335 in main memory 331 of system 300). In the exemplary embodiment, the order waits within the fulfillment queue to be placed into a message to be sent to vendor node 340 so that the vendor can ship the gift directly to the recipient.

At step 510, the user has selected the exchangeable fulfillment option (preferably called an EXPRESS GIFT™ service fulfillment option) and at step 512 the user is able to select customization options. For example, the user may want to customize or personalize delivery of the gift by adding an audio and/or video message to announce the greeting or add a personalized text message (such as a personally annotated and animated online greeting card).

At step 514, the user (the gift giver) provides payment information, such as the user's credit card information or a reference to a specific gift certificate that was issued to the user in the past. At step 516, the user provides contact information on the recipient. This typically includes the recipient's name and electronic mail address. However, such contact information can also include other types of information such as a street address, postal address, a telephone number, or facsimile number.

After step 516, the method 500 performs steps 518 and 520. Preferably, these steps are performed concurrently. However, in other embodiments of the invention, these steps can be performed sequentially in any order. At step 518, the gift server computer system generates a notification for the recipient based upon the contact information entered in step 516. In the exemplary embodiment, an electronic mail message is transmitted from gift server computer system 330 to the recipient's electronic mail address on behalf of the gift giver. Typically, the notification includes instructions on how to connect to the gift server computer system 330 and claim the selected gift. In one embodiment, a specific identifier is not typically included in the notification because the gift server computer system 330 is able to automatically determine an identifier linking the recipient to the appropriate order information. However, in another embodiment, an identifier is typically included with the notification so that the recipient can later provide it to the gift server computer system 330 so to associate the recipient with the appropriate order information.

At step 520, the order information related to the selected gift is stored in part of the gift server computer system's memory. This part of the memory is one of queues 335 and is preferably referred to as a gift queue.

At step 522, the recipient receives the notification and clicks on a link to connect with the gift server computer system and "pickup" the selected gift. In the exemplary embodiment, the notifications typically inform the recipient to click on a hyperlink (associated with the website served by the gift server computer system 330) within the electronic mail notification message. When the hyperlink is clicked, contact with the gift server computer system is initiated through the recipient's browsing software.

Once contact is established, the recipient's gift order information is retrieved from the gift queue in memory at step 524. In the exemplary embodiment, this is similar to the viewing the EXPRESS GIFT™ service summary page as illustrated in FIG. 2A. At step 526, the recipient views the multimedia greeting message, greeting card and gift as shown in the exemplary embodiment by FIGS. 2B–2E.

At step 528, if the recipient selects to accept the gift, step 528 proceeds to step 540. At step 540, if the recipient is satisfied with the existing order options (such as product options or shipping options), step 540 proceeds to step 508 where the order is sent to the direct fulfillment queue for transmission to the appropriate vendor. Otherwise, step 540 proceeds to step 542 where the existing order is advantageously modified by the recipient prior to shipping of the product from the vendor. After step 542, the modified order is sent to the direct fulfillment queue for transmission to the appropriate vendor.

If the recipient has selected to exchange the gift, step 528 proceeds to step 530. At step 530, an electronic gift certificate is generated and presented to the recipient. At step 532, if the recipient uses the electronic gift certificate to select or purchase a replacement gift item in the current online session, step 532 proceeds to step 536 where a new order is created and then sent to the direct fulfillment queue at step 508.

As previously mentioned, if the replacement gift item is for a lesser cost than the initially selected gift, then another electronic gift certificate may be generated and redeemed in a customized manner. This allows the recipient to select whether a single gift certificate is desired or multiple gift certificates are desired from one or more vendors associated with the gift server computer system. For example, the recipient may select a replacement gift from vendor A and two different gift certificates from vendor B and vendor C all in one transaction and prior to shipping of any product.

However, if the recipient can decide or wants to put off the decision for a replacement gift (and does not want an actual gift certificate to issue from a vendor), step 532 proceeds to step 534 where the electronic gift certificate is stored in memory until the recipient's next session or connection with the gift server computer system 330.

The foregoing description of embodiments of the invention has been presented for purposes of illustration and description. It is not exhaustive and does not limit the invention to the precise form disclosed. Modifications and variations are possible in light of the above teachings or may be acquired from practicing of the invention. For example, the described implementation includes a particular network configuration but the present invention may be implemented in a variety of data communication network environments using software, hardware or a combination of hardware and software on the gift serving node to provide the accepting and exchanging functionality. Furthermore, systems consistent with the present invention are applicable when executing programs written in all types of computer programming languages, including the Java™ programming language and the C++ programming language.

Therefore, the scope of the invention is defined strictly by the claims and their equivalents.

What is claimed is:

1. A method for electronically exchanging an online gift prior to shipping the online gift from a vendor of the online gift, comprising the steps of:

generating a notification related to the online gift, the notification identifying a recipient for the online gift;

retrieving order information related to the online gift;

displaying the order information to the recipient;

determining whether the recipient wants to exchange the online gift for a replacement gift;

if the recipient selects to exchange the online gift for the replacement gift, selecting the replacement gift from a plurality of alternative gift items; and placing an electronic order for the replacement gift prior to physically receiving the online gift.

2. A computer-readable medium containing instructions for electronically exchanging an online gift prior to shipping the online gift from a vendor of the online gift, which when executed, the instructions comprising the steps of:

generating a notification related to the online gift, the notification identifying a recipient for the online gift;

retrieving order information related to the online gift;

displaying the order information to the recipient;

determining whether the recipient wants to exchange the online gift for a replacement gift;

if the recipient selects to exchange the online gift for the replacement gift, selecting the replacement gift from a plurality of alternative gift items; and placing an electronic order for the replacement gift prior to physically receiving the online gift.

3. A computer system within a networked environment for electronically exchanging an online gift prior to shipping the online gift from a vendor of the online gift, comprising:

a memory storage device for maintaining a description of a plurality of gift items including the online gift and a replacement gift and a plurality of alternative gift items; and a processor coupled to the memory storage device, the processor being operative to reading the description of the gift items from the memory storage device, generate a notification related to the online gift, the notification identifying a recipient for the online gift, retrieve order information related to the online gift, display the order information to the recipient, determine whether the recipient wants to exchange the online gift for a replacement gift, if the recipient wants to exchange the online gift for the replacement gift, select the replacement gift from the description of the alternative gift items, and place an electronic order to a vendor node in the networked environment for the replacement gift prior to physically receiving the online gift.

4. A method for electronically exchanging a first product for a second product prior to physically receiving the first product, comprising the steps of:

retrieving information related to the first product;

generating a notification related to the first product, the notification identifying a recipient of the first product;

displaying the information to the recipient for the first product; and determining whether the recipient wants to exchange the first product prior to physically receiving the first product, wherein the recipient of the first product is not a purchaser of the first product.

5. The method of claim 4 further comprising the step of selecting the second product as an alternative to the first product if the recipient selects to exchange the first product.

6. The method of claim 5 further comprising the step of placing an order for the second product prior to physically receiving the first product.

7. The method of claim 4 further comprising the step of generating notification related to the first product, the notification identifying a recipient for the first product.

8. The method of claim 5, wherein the selecting step further comprises selecting the first product with at least one different option as the second product.

9. The method of claim 8, wherein the at least one different option is a shipping option.

10. The method of claim 8, wherein the at least one different option is a product option.

11. The method of claim 4, wherein the first product is associated with the first vendor and the second product is associated with a second vendor.

12. The method of claim 4, wherein the second product is an actual gift certificate.

13. The method of claim 12, wherein the second product is a plurality of actual gift certificates from at least one of a plurality of vendors.

14. The method of claim 13 further comprising the step of selecting an amount for each of the actual gift certificates.

15. The method of claim 4, wherein the second product is an electronic gift certificate acceptable as a method of payment with any of a plurality of vendors.

16. The method of claim 15, wherein the second product further comprises a replacement item and the electronic gift certificate representing a difference in value between the first product and the replacement item.

17. The method of claim 15 further comprising the step of storing the electronic gift certificate for use in a later online session.

18. A computer-readable medium containing instructions for electronically exchanging a first product for a second product prior to physically receiving the first product, which when executed the instructions comprising the steps of:

notifying a recipient that the first product is intended for the recipient;

retrieving information related to the first product, the information including at least one product option and at least one shipping option;

displaying the information to the recipient;

determining whether the recipient wants to accept the first product prior to physically receiving the first product; and receiving recipient input selecting the second product as an alternative to the first product if the recipient does not want to accept the first product.

19. The computer-readable medium of claim 18 further comprising the step of fulfilling an order for the second product prior to physically receiving the first product if the recipient does not want to accept the first product.

20. The computer-readable medium of claim 18, wherein the receiving step further comprises receiving the recipient input selecting the first product with a different product option as the second product.

21. The computer-readable medium of claim 18, wherein the receiving step further comprises receiving the recipient input selecting the first product with a different shipping option as the second product.

22. The computer-readable medium of claim 18, wherein the first product is associated with a first vendor and the second product is associated with a second vendor.

23. The computer-readable medium of claim 18, wherein the second product is an actual gift certificate.

24. The computer-readable medium of claim 23, wherein the second product is a plurality of actual gift certificates from at least one of a plurality of vendors.

25. The computer-readable medium of claim 24 further comprising the step of selecting an amount for each of the actual gift certificates.

26. The computer-readable medium of claim 18, wherein the second product is an electronic gift certificate acceptable as a method of payment with any of a plurality of vendors.

27. The computer-readable medium of claim 18, wherein the second product further comprises a replacement item and the electronic gift certificate representing a difference in value between the first product and the replacement item.

28. The computer-readable medium of claim 18 further comprising the step of storing the electronic gift certificate for use in a later online session.

29. A system within a networked environment for electronically exchanging a first product for a second product prior to shipping the first product, comprising:

a memory storage device for maintaining a description of a plurality of products including the first product and the second product;

a processor coupled to the memory storage device;

a display device coupled to the processor; and the processor being operative to generate a notification related to the first product, the notification identifying a recipient for the first product with contact information, retrieve product information from the description of the products maintained in the memory storage device, the product information being related to the first product, cause the display device to display the product information, and receive input from the recipient indicating the recipient wants to exchange the first product prior to physically receiving the first product.

30. The system of claim 29, wherein the processor is further operative to retrieve data related to the second product from the description in the memory storage device, cause the display device to display the data, and receive input from the recipient indicating the recipient wants to exchange the first product for the second product.

31. The system of claim 30, wherein the processor is further operative to send a message to a vendor node in the networked environment, the message being associated with an order for the second product.

32. The system of claim 30, wherein the second product is the first product with a different shipping option.

33. The system of claim 32, wherein the second product is the first product with a different product option.

34. The system of claim 29, wherein the second product is an actual gift certificate.

35. The system of claim 34, wherein the second product is a plurality of actual gift certificates from at least one of a plurality of vendors.

36. The system of claim 35, wherein the processor is further operative to receive input from the recipient, the input designating an amount for each of the actual gift certificates.

37. The system of claim 29, wherein the second product is an electronic gift certificate acceptable as a method of payment with any of a plurality of vendors.

38. The method of claim 37, wherein the second product further comprises a replacement item and the electronic gift certificate representing a difference in value between the first product and the replacement item.

39. The method of claim 37 further comprising the step of storing the electronic gift certificate for use in a later online session.

40. The system of claim 29, wherein the contact information comprises an electronic mail address associated with the recipient.

* * * * *